United States Patent
Ressler et al.

(10) Patent No.: US 9,699,963 B2
(45) Date of Patent: Jul. 11, 2017

(54) MULCH KIT CONTROL LEVER

(71) Applicant: Deere & Company, Moline, IL (US)

(72) Inventors: Kyle T. Ressler, West Bend, WI (US);
Derek M. Woody, Beaver Dam, WI (US); Melissa Tolson, Horicon, WI (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 14/737,000

(22) Filed: Jun. 11, 2015

(65) Prior Publication Data

US 2016/0360693 A1    Dec. 15, 2016

(51) Int. Cl.
| A01D 34/71 | (2006.01) |
| A01D 75/00 | (2006.01) |
| A01D 34/00 | (2006.01) |
| A01D 42/00 | (2006.01) |

(52) U.S. Cl.
CPC ........... *A01D 34/71* (2013.01); *A01D 34/005* (2013.01); *A01D 42/005* (2013.01); *A01D 75/006* (2013.01)

(58) Field of Classification Search
CPC .... A01D 67/00; A01D 75/006; A01D 43/087; A01D 34/005; A01D 34/71; A01D 42/005
USPC .............................................. 56/320.1, 320.2
See application file for complete search history.

(56) References Cited

U.S. PATENT DOCUMENTS

| 3,949,540 A * | 4/1976 | Christopherson .... A01D 43/063 56/202 |
| 3,974,629 A | 8/1976 | Russell et al. |
| 4,189,903 A | 2/1980 | Jackson et al. |
| 4,435,949 A | 3/1984 | Heismann |
| 4,726,178 A | 2/1988 | Mallaney et al. |
| 4,901,509 A | 2/1990 | Leuz |
| 4,951,449 A | 8/1990 | Thorud |
| 5,090,183 A | 2/1992 | Thorud et al. |
| 5,129,217 A | 7/1992 | Loehr |
| 5,179,823 A | 1/1993 | Pace |
| 5,305,589 A | 4/1994 | Rodriguez et al. |
| 5,410,867 A | 5/1995 | Plamper et al. |
| 5,442,902 A | 8/1995 | Mosley et al. |
| 5,488,821 A | 2/1996 | McCunn et al. |
| 5,626,008 A | 5/1997 | Puszkar |
| 5,628,171 A | 5/1997 | Stewart et al. |
| 5,765,346 A | 6/1998 | Benter et al. |

(Continued)

FOREIGN PATENT DOCUMENTS

DE    60319025 T2    2/2009

OTHER PUBLICATIONS

British Search Report in foreign counterpart application GB1610253.5 dated Dec. 8, 2016 (4 pages).

(Continued)

*Primary Examiner* — John G Weiss

(57) ABSTRACT

A mulch kit control lever with a detent plate attached to the top surface of a mower deck, and a vertically oriented pivot pin extending through the detent plate and through the mower deck and engaging a mulch gate. A pivoting handle connected to the pivot pin moves the mulch gate between a side discharge position and a mulching position. A detent pin on the handle abuts a first stop on the detent plate in the side discharge position and a second stop on the detent plate in the mulching position.

10 Claims, 5 Drawing Sheets

(56) References Cited

U.S. PATENT DOCUMENTS

| | | | |
|---|---|---|---|
| 5,845,475 A | 12/1998 | Busboom et al. | |
| 5,894,717 A | 4/1999 | Yamashita et al. | |
| 5,987,863 A | 11/1999 | Busboom et al. | |
| 6,609,358 B1 | 8/2003 | Schmidt et al. | |
| 6,862,875 B2* | 3/2005 | Iida | A01D 34/71 56/320.2 |
| 7,146,791 B2 | 12/2006 | Benway et al. | |
| 7,204,073 B1 | 4/2007 | Chenevert | |
| 7,367,174 B2 | 5/2008 | Grimwade | |
| 7,624,562 B2* | 12/2009 | Kallevig | A01D 34/71 56/320.2 |
| 7,677,022 B2 | 3/2010 | Chenevert et al. | |
| 7,805,920 B2 | 10/2010 | Hurst et al. | |
| 8,132,396 B2* | 3/2012 | Minami | A01D 42/005 56/320.1 |
| 8,234,849 B2* | 8/2012 | Shimozono | A01D 42/005 56/320.1 |
| 2003/0182915 A1 | 10/2003 | Kobayashi et al. | |
| 2005/0076629 A1 | 4/2005 | Iida et al. | |
| 2007/0068132 A1 | 3/2007 | Chenevert | |
| 2009/0031690 A1 | 2/2009 | Kallevig et al. | |
| 2009/0301050 A1* | 12/2009 | Kohler | A01D 34/71 56/320.2 |
| 2014/0318099 A1 | 10/2014 | Thorman et al. | |
| 2014/0331634 A1 | 11/2014 | Korthals et al. | |

OTHER PUBLICATIONS

Search Report issued in counterpart application No. DE102016210183.8 dated May 4, 2017 (10 pages).

* cited by examiner

MULCH KIT CONTROL LEVER

FIELD OF THE INVENTION

This invention relates to mower decks and, more specifically, multi-blade mower decks with mulch kits for conversion between side discharge and mulching positions.

BACKGROUND OF THE INVENTION

Multi-blade mower decks have been manufactured and sold with hinged baffles that may be pivoted between side discharge and mulching positions. For example, U.S. Pat. No. 6,609,358 entitled "Mower Having a Mower Deck Adapted for Selective Mulching or Non-Mulching Modes" relates to a multi-blade mower deck with hinged baffles that may pivot from side discharge to mulching positions. The hinged baffles may be secured to the underside of the mower deck by threaded fasteners or welds, and the baffles connected to a control structure on top of the deck.

Mulch kits also have been manufactured and sold for multi-blade mower decks, which typically include one or more mulch plugs, plates or baffles that an operator may secure to the underside of the mower deck. These mulch kits are relatively low in cost, but the operator must reach under the deck to remove the plugs, plates or baffles to convert the mower back to the side discharge position.

There is a need for a mulch kit that is relatively inexpensive and easy to install, but does not require an operator to reach under the deck to remove plugs, plates or baffles to convert the mower between the side discharge and mulching positions. There is a need for a low cost mulch kit with a control lever mounted on top of the deck that an operator may use to move the baffles between side discharge and mulching positions. There is a need for a mulch kit with a control lever that has fewer parts than existing mulch/side discharge systems.

SUMMARY OF THE INVENTION

A mulch kit control lever for pivoting a mulch gate between a side discharge position and a mulching position. The mulch kit control lever includes a pivoting handle mounted on a detent plate and having a detent abutting a first stop on the detent plate in the side discharge position and a second stop on the detent plate in the mulching position. A pivot pin extends through the detent plate and connects the mulch gate to the pivoting handle. A spring around the pivot pin helps the mulch kit control lever securely hold the mulch gate in the mulch or side discharge position. The mulch kit control lever is relatively quick and easy to install and use, is low in cost, and has fewer parts than existing devices.

DESCRIPTION OF THE PREFERRED EMBODIMENT

Figure 1:
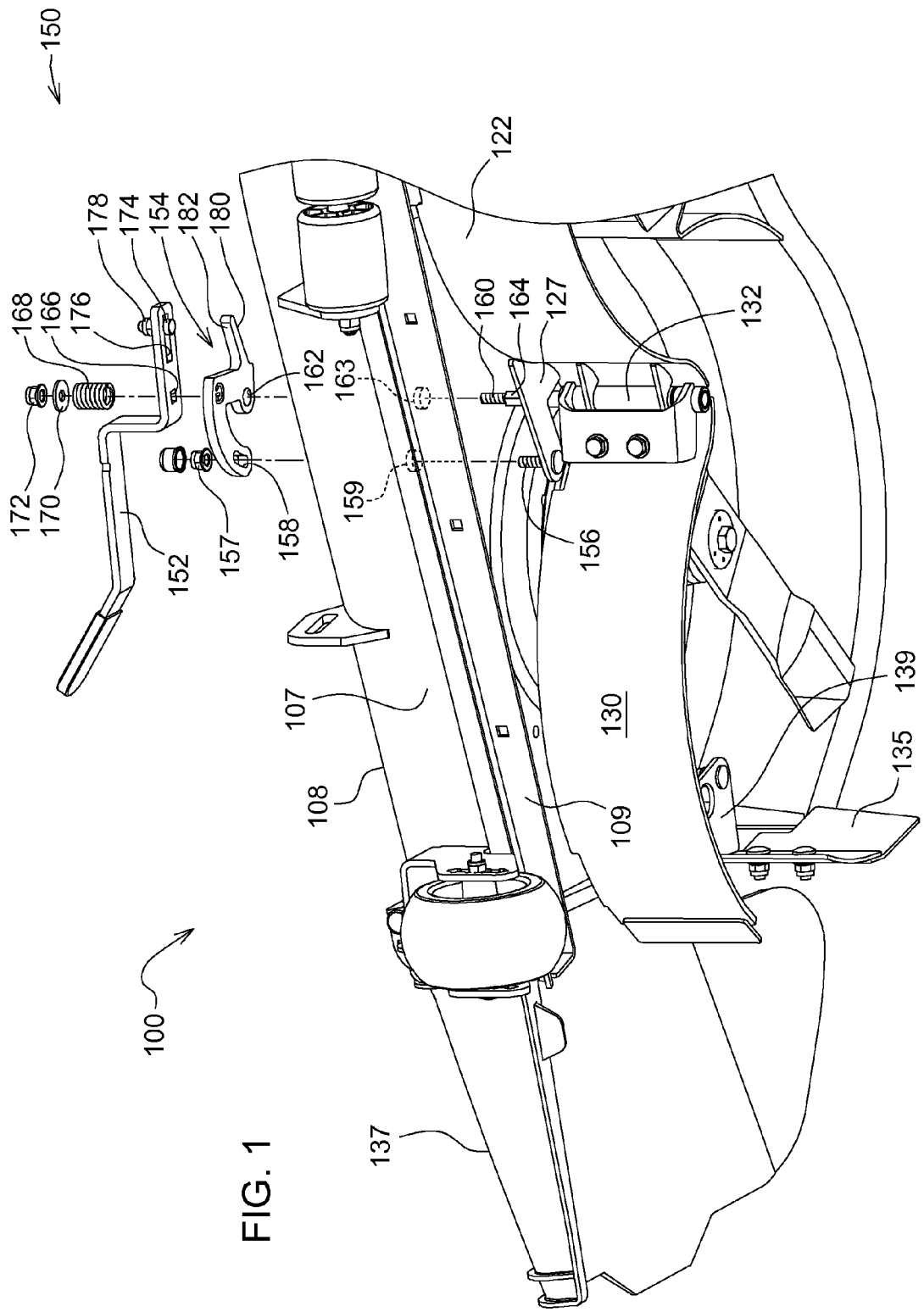
FIG. 1 is an exploded perspective view of a mulch kit control lever according to a first embodiment of the invention.

As shown in FIG. 1, in a first embodiment, mulch kit control lever 150 may include stepped handle 152 pivotably mounted to detent plate 154 attached to the top surface 108 of mower deck 100. To secure the detent plate to the top surface of the mower deck, threaded fastener 156 may be inserted though hole 159 in the mower deck's top surface, and through detent plate slot 158, then secured with nut 157. Pivot pin 160 may be vertically oriented and inserted through hole 163 in the mower deck's top surface, and through hole 162 in the detent plate. The pivot pin may be attached to the hinged end of mulch gate 130 under the deck. An intermediate portion 164 of pivot pin 160 may extend above the detent plate and engage mulch kit control lever 150. For example, the intermediate portion of the pivot pin may have a square cross section that may engage square hole 166 in stepped handle 152. The pivot pin may have any cross section that engages a matching hole in the pivoting stepped handle, so that the handle may be pivoted to turn the pivot pin to open and close the mulch gate.

In one embodiment, mulch kit control lever 150 may include coil spring 168 that may be inserted around pivot pin 160 above the lever. The coil spring may be compressed against the lever by washer 170 and nut 172 threaded to the upper end of pivot pin 160.

In one embodiment, mulch kit control lever 150 may include detent pin 174 attached to the mulch kit control lever adjacent the first end of the stepped handle. For example, the detent pin may be inserted through slot 176 and tightened to threaded nut 178. The detent pin may face downwardly and abut a first stop or edge 180 of the detent plate in the side discharge position, and may abut a second stop or edge 182 of the detent plate in the mulching position. Spring 168 may urge the detent pin downwardly against the detent plate. An operator may adjust the position of the detent pin on the stepped handle by moving it to a different location within slot 176.

In one embodiment, the mulch kit control lever may be used to pivot mulch gate 130 between the mulching and side discharge positions, by pushing down on the stepped handle 152 to compress coil spring 168. Pushing down on the stepped handle not only compresses the spring, but also raises the first end of the stepped handle. When the first end of the stepped handle raises sufficiently to lift detent pin 174 above detent plate 154, the stepped handle may be used to pivot the mulch kit control lever between the first stop in the mulching position and the second stop in the side discharge position. After the mulch kit control lever reaches the desired position, the operator may release the downward pressure on the handle, and coil spring 168 may bias the detent pin and first end of the stepped handle back downwardly against the detent plate to help hold the detent pin in place next to the first stop or second stop.

Figure 2:
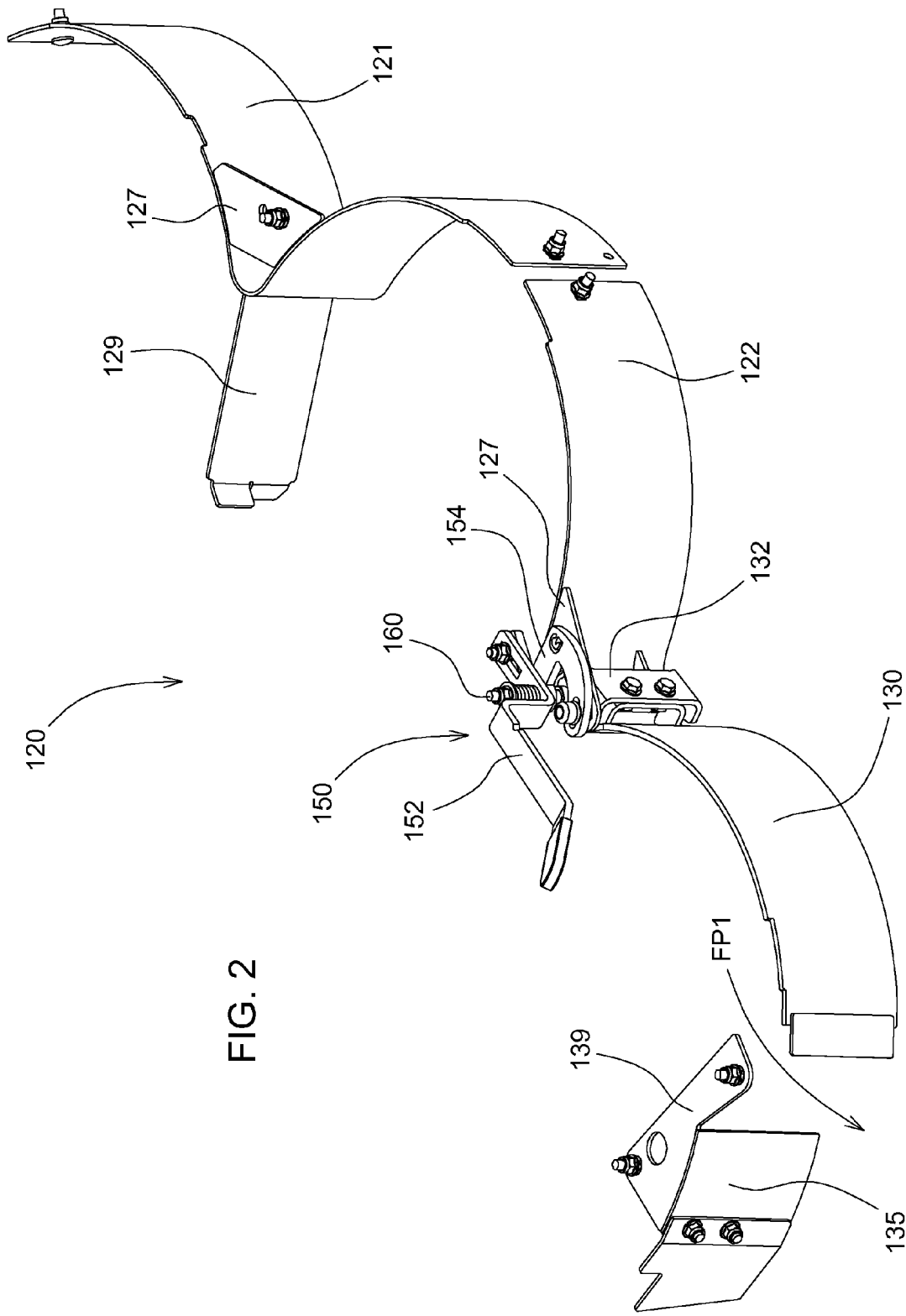
FIG. 2 is a top perspective view of a mulch kit with a mulch kit control lever according to a first embodiment of the invention, in a side discharge position.

In one embodiment, mulch kit control lever 150 may be used with mulch kit 120 shown in FIG. 2. The mulch kit may include left front deflector plate or baffle 121 and right front deflector plate or baffle 122, both secured to the underside of the mower deck. The mulch kit may include vertical hinge 132 mounted to the right end of the right front deflector plate or baffle. Each of the front deflector plates or baffles may have a curved or arced surface and may extend down from the underside of the deck to a horizontal plane below the plane of the cutting blades. The mulch kit may include stationary deflector or baffle 135 which may be secured to the underside of the deck with horizontal flange 139. The mulch kit also may include mulch gate 130 which may be a hinged baffle attached to vertically oriented hinge 132 at the right edge of right front deflector plate or baffle 122. In the side discharge position, mulch gate 130 may swing or pivot forwardly, sot that flow passage FP1 may be open through an opening between mulch gate 130 and stationary deflector or baffle 135. The mulch kit also may include baffle 129 having a vertical dimension less than the deflector plates or baffles 121, 122. Baffle 129 may allow some grass clippings to flow between the left cutting chamber and the second or center cutting chamber, and may be connected to one or more baffles at or adjacent the rear of the cutting chambers.

Figure 4:
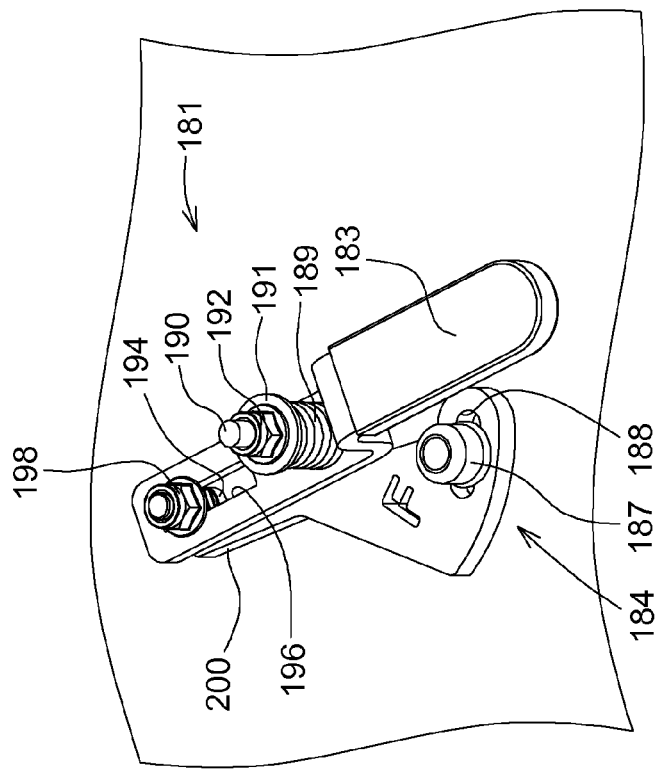
FIG. 4 is a top perspective view of a mulch kit control lever in a mulching position, in a second embodiment of the invention.
Figure 3:
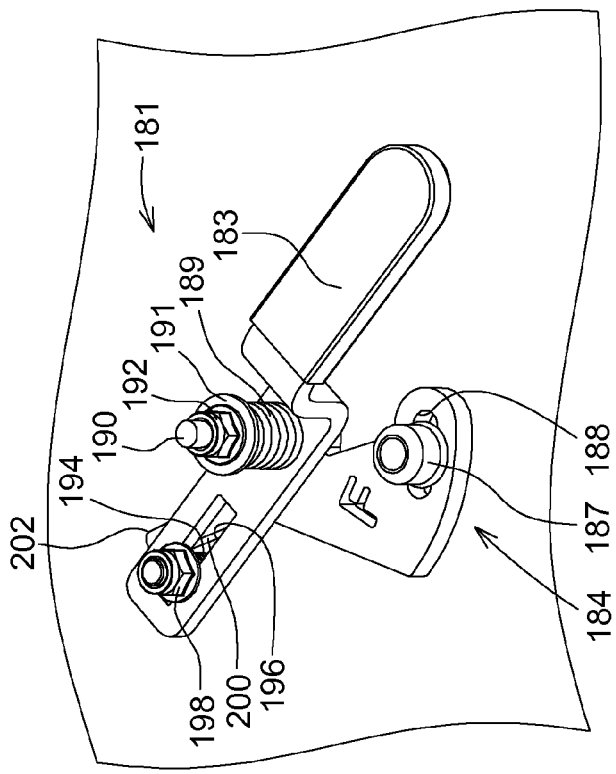
FIG. 3 is a top perspective view of a mulch kit control lever in a side discharge position, in a second embodiment of the invention.

As shown in FIGS. 3 and 4, in a second embodiment, mulch kit control lever 181 may be used with detent plate 184 mounted to the top surface of the mower deck. Mulch kit control lever 181 may include stepped handle 183. A threaded fastener may be inserted through a hole in the mower deck's top surface, and through detent plate slot 188, then secured with nut 187 to secure the detent plate to the top surface of the mower deck. Pivot pin 190 may be inserted through a hole in the mower deck's top surface, and through a hole in the detent plate. The pivot pin may be attached to the hinged end of the mulch gate under the deck. An intermediate portion of pivot pin 190 may have a square cross section and may extend above the detent plate and engage a matching square hole in mulch kit control lever 181. Engagement between the pivot pin and the lever allows the lever to pivot the mulch gate open and closed, preferably less than about 45 degrees. Although a square cross section is preferred to engage the pivot pin to the mulch kit control lever, other alternatives for engagement between the pivot pin and control lever may be used, so that the lever on the deck may turn the pivot pin and mulch gate.

In the second embodiment shown in FIGS. 3 and 4, mulch kit control lever 181 may include coil spring 189 inserted around pivot pin 190 above the lever and may be compressed against the lever by washer 191 and nut 192 threaded to the upper end of pivot pin 190. Detent pin 194 may be attached near the first end of the mulch kit control lever, by inserting the detent pin through slot 196 and tightening threaded nut 198. The detent pin may face downwardly and abut a first stop or edge 200 of the detent plate in the side discharge position of FIG. 3, or second stop or edge 202 of the detent plate in the mulching position of FIG. 4. An operator may adjust the position of the detent pin by moving it to a different location within slot 196.

Figure 5:
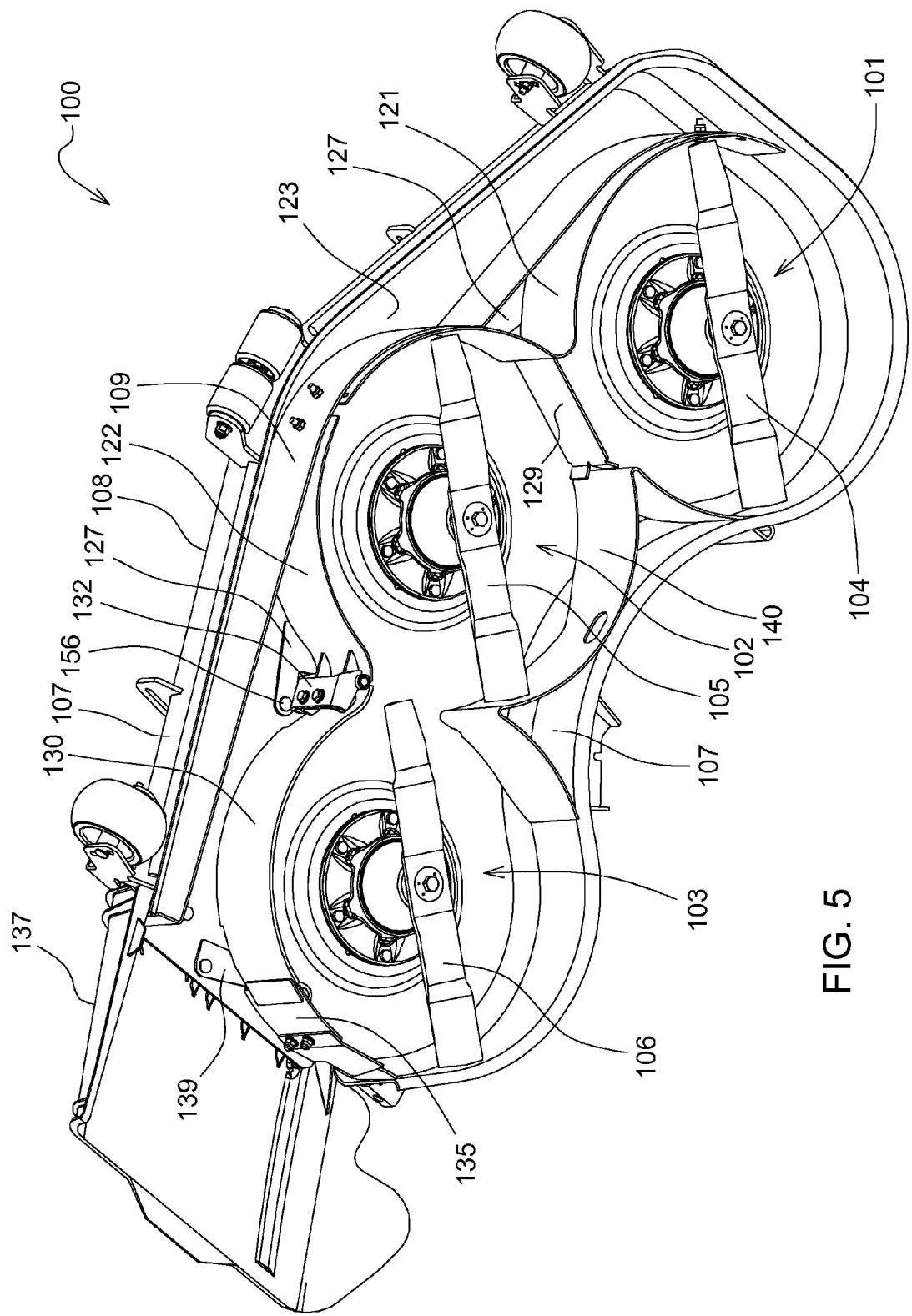
FIG. 5 is a bottom perspective view of a mower deck with a mulch kit in a mulching position, according to a first embodiment of the invention.
Figure 6:
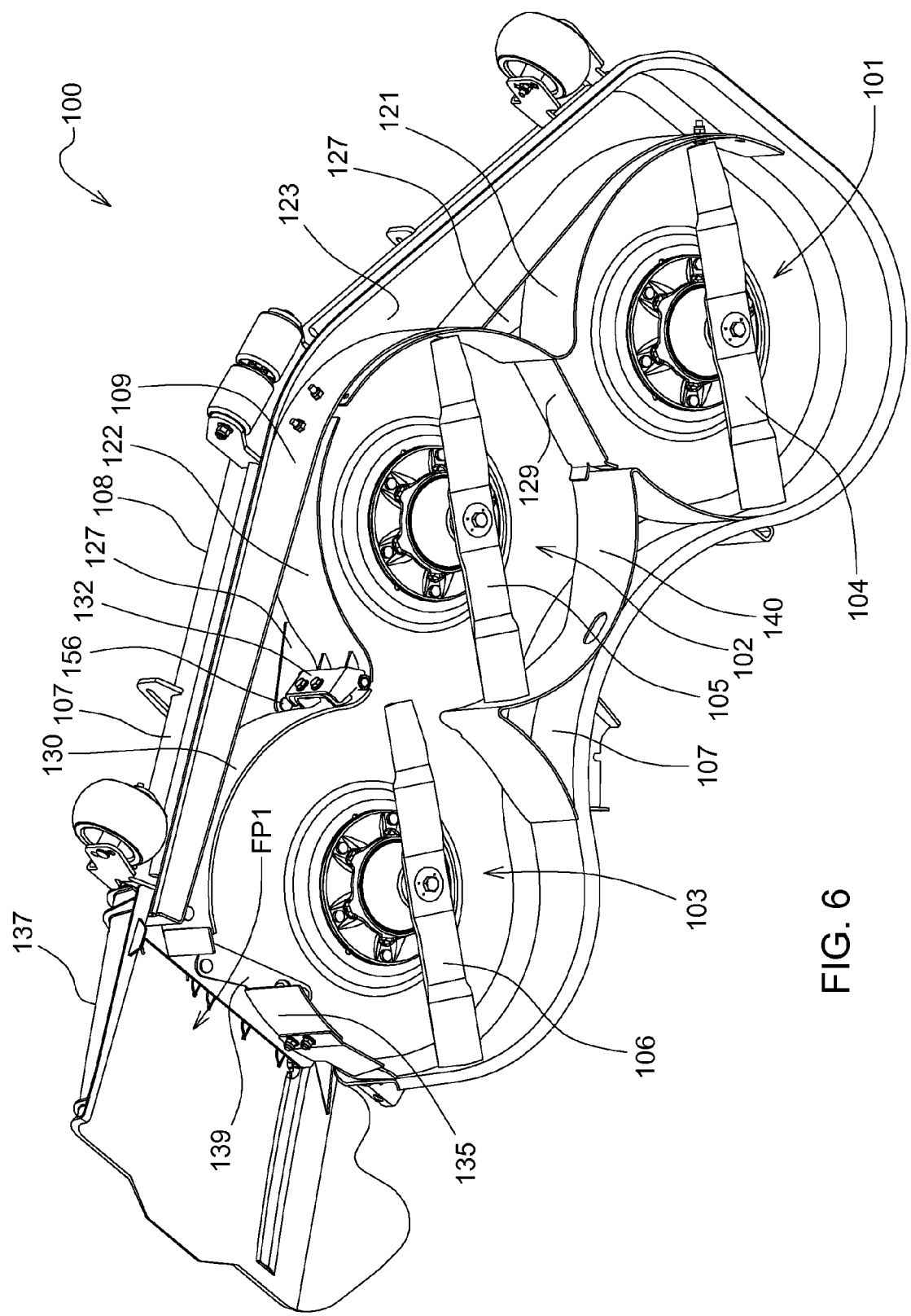
FIG. 6 is a bottom perspective view of a mower deck with a mulch kit in a side discharge position, according to a first embodiment of the invention.

As shown in FIGS. 5 and 6, the mulch kit may include left front deflector plate or baffle 121 extending down from the underside of the mower deck at least partially around the front of the perimeter of left cutting chamber 101, and at least partially around the front of the perimeter of center cutting chamber 102. Mulch kit 120 also may include right front deflector plate or baffle 122 that extends down from the underside of the mower deck partially at least partially around the front of the perimeter of center cutting chamber 102. Vertical hinge 132 may be mounted to the right end of the right front deflector plate or baffle, between the center cutting chamber 102 and right cutting chamber 103. Each of the front deflector plates or baffles may have a curved or arced surface and may extend down from the underside of the deck to a horizontal plane below the plane of the cutting blades. The left and right front deflector plates may abut each other or may be adjacent to each other at or near the front of cutting chamber 102. Alternatively, the pair of front deflector plates or baffles may be joined together to form a one-piece deflector plate.

As shown in FIGS. 5-6, in a first embodiment, the mulch kit and mulch kit control lever may be used with a multi-blade mower deck 100 having three adjacent cutting chambers 101, 102, 103, with each cutting chamber covering or housing a rotary cutting blade 104, 105, 106. The cutting blades may be mounted and secured to the lower ends of generally vertically oriented spindles for rotation on vertical axes. The spindles may be rotated by one or more belts wound around pulleys attached to the upper ends of the spindles.

In one embodiment, the mulch kit and mulch kit control lever may be used with a mower deck 100 having a skirt 107 extending downwardly around at least a portion of the outer periphery of top surface 108 of the mower deck. Vertical baffle 109 may be welded or otherwise attached to the underside of the mower deck forwardly of the cutting chambers at a location to the rear of the front skirt. Gauge wheels may be attached to the skirt and/or periphery of the mower deck to help prevent or minimize damage or scalping of the ground surface or turf when mowing.

In one embodiment, mulch kit 120 may include front deflector plates or baffles 121, 122 that are releasably fastened and/or secured to the underside 123 of mower deck 100. For example, the front deflector plates or baffles may be attached to vertical baffle 109 with threaded studs, carriage bolts with serrated washers, or other threaded connectors. Additionally, the front deflector plates or baffles may be attached to or engaged to horizontal flanges 127 at the front of the deflector plate(s), with threaded connectors to secure the flanges to the underside of the mower deck.

In one embodiment, mulch kit 120 may include stationary deflector or baffle 135 that extends down from the underside of the mower deck at least partially closing the discharge chute at the right side of the perimeter of right cutting chamber 103. For example, stationary deflector or baffle 135 may be removably secured to the underside of the mower deck so that it blocks that portion of the flow passage FP1 that is rearwardly of the spindle for cutting blade 106. The stationary deflector plate or baffle may be secured to the underside of the deck using a horizontal flange 139 and one or more threaded studs.

In one embodiment, mulch kit 120 may include mulch gate 130 which may be a hinged baffle attached to vertically oriented hinge 132 at the right edge of right front deflector plate or baffle 122. In the mulching position shown in FIG. 5, mulch gate 130 may extend at least partially around the front and right of the perimeter of the first or right cutting chamber 103. In the mulching position, mulch gate 130 may abut stationary deflector or baffle 135 on the side of the first or right cutting chamber, to close or block flow passage FP1 from the first or right cutting chamber out through an opening in side skirt 107 at the side of the mower deck and under side discharge deflector 137.

In one embodiment, mulch kit 120 may include mulch gate 130 that may swing or pivot forwardly from the mulching position to the side discharge position adjacent front skirt 107 at the front of the mower deck, as shown in FIG. 6. In the side discharge position, flow passage FP1 is open from first or right cutting chamber 103 out through an opening in the side skirt at the side of the mower deck and under side discharge chute 137. The open portion of flow passage FP1 may be between mulch gate 130 and stationary deflector or baffle 135. Preferably, in the side discharge position, the open portion of flow passage FP1 may be limited to less than about 45 degrees around the circumference of the first or right cutting chamber. In both the mulching and the side discharge positions, mulch gate 130 may remain covered by and under the mower deck. Optionally, a material collection system may be attached to the side of the mower deck for collection of grass clippings. The material collection system also may include an impeller or fan.

In one embodiment, mulch kit 120 may include baffle 129 between cutting chambers 101 and 102. Baffle 129 may have a vertical dimension less than the deflector plates or baffles 121, 122 so that it may allow some grass clippings to move between the left cutting chamber and the second or center cutting chamber. Baffle 129 also may be connected to one or more baffles 140 at or adjacent the rear of the cutting chambers.

Having described the preferred embodiment, it will become apparent that various modifications can be made without departing from the scope of the invention as defined in the accompanying claims.

The invention claimed is:

1. A mulch kit control lever, comprising:
    a detent plate attached to a top surface of a mower deck, the detent plate having a first stop and a second stop;
    a vertically oriented pivot pin extending through the detent plate and through the mower deck and engaging a mulch gate;
    a handle having a first end and a second end and an intermediate portion engaging the pivot pin and pivoting to move the mulch gate between a side discharge position and a mulching position;
    a detent pin on the first end of the handle abutting the first stop on the detent plate in the side discharge position and the second stop on the detent plate in the mulching position; and
    a coil spring around the pivot pin biasing the detent pin down against one of the first stop and the second stop of the detent plate, the coil spring compressible by pushing down the second end of the handle to move the detent pin off the detent plate.

2. The mulch kit control lever of claim 1 wherein a portion of the pivot pin has a square cross section engaging a square hole in the handle.

3. The mulch kit control lever of claim 1 wherein the handle is stepped.

4. The mulch kit control lever of claim 1 wherein the detent pin is adjustably located in a slot in a first end of the handle.

5. A mulch kit control lever, comprising:
    a handle connected by a vertically oriented pivot pin to a pivoting mulch gate;
    a detent pin on the handle abutting a first stop on a detent plate when the mulch gate is in a side discharge position and abutting a second stop on a detent plate when the mulch gate is in a mulching position; and
    a coil spring around the vertically oriented pin and biasing the detent pin downwardly against the detent plate; the coil spring compressible by pushing down the handle to lift the detent pin above the detent plate.

6. The mulch kit control lever of claim 5 wherein the vertically oriented pivot pin extends through a hole in the detent plate.

7. The mulch kit control lever of claim 5 further comprising a vertical hinge connecting the mulch gate to a deflector plate.

8. The mulch kit control lever of claim 7 wherein the vertically oriented pivot pin extends through the vertical hinge.

9. A mulch kit control lever, comprising:
    a mulch gate pivoting between a side discharge position and a mulching position;
    a pivoting handle mounted on a detent plate and having a detent abutting a first stop on the detent plate in the side discharge position and a second stop on the detent plate in the mulching position;
    a pivot pin extending through the detent plate and connecting the mulch gate to the pivoting handle; and
    a coil spring around the pivot pin biasing the detent down against one of the first stop and the second stop of the detent plate, the coil spring compressible by pushing down the pivoting handle to raise the detent off the detent plate.

10. A mulch kit control lever of claim 9 wherein the pivot pin is in a hinge between the mulch gate and a deflector plate.

* * * * *